Patented Apr. 29, 1941

2,240,081

UNITED STATES PATENT OFFICE 2,240,081

HYDROCARBON DRYING OIL

Charles A. Thomas, Dayton, Ohio, assignor to Monsanto Chemical Company, St. Louis, Mo., a corporation of Delaware No Drawing. Application March 19, 1938, Serial No. 196,896

7 Claims. (Cl. 196—50)

My invention relates to unsaturated oils and methods of producing them from polymerized hydrocarbons. More particularly my invention relates to unsaturated oils which may be used as drying oils and methods of producing same from polymerized hydrocarbons.

It is known that oils may be prepared from naturally occurring oxygen-containing resins, such as rosin or colophony, by steam distillation in the presence of phosphoric acid. However, such products are too saturated and dry too slowly to be of particular value as drying oils.

The present invention relates to a process for preparing unsaturated oils by the thermal treatment of hydrocarbon polymers in the presence of an acid of phosphorus.

The chief object of my invention is the preparation of a drying oil which can be used in the arts, such as the varnish and paint arts, as a partial or total substitute for the unsaturated vegetable oils which are used at present.

Another object of my invention is the preparation of a product having improved physical and chemical characteristics. This is evidenced by the improved viscosity, color and unsaturation of the oils prepared in my preferred manner.

Another object of my invention is the conversion of polymeric waste products into useful and valuable substances.

Still other objects of my invention will be apparent to those skilled in the art.

I have discovered that if hydrocarbon polymers be treated in a certain manner hereinafter fully described, a product will be obtained which will have properties adapting it for use as a drying oil and which will not only possess desirable fast drying qualities but will also yield a film possessing very desirable properties. The undesirable brittleness in the dried film which is characteristic of films prepared from hydrocarbon drying oils available up to the present time, is noticeably absent in films prepared from the oils produced in my preferred manner.

Furthermore, the properties of the material prepared in my preferred manner are such that it may be used as the sole source of drying oil, or it may be readily blended with the commonly used drying or semi-drying oils in varying proportions. In this manner products possessing any desired characteristics are readily obtained.

In carrying out my process for the production of improved oils, I start with a hydrocarbon polymer which has been obtained by the treatment of unsaturated hydrocarbons. These polymeric substances may have been prepared by the action of heat, acids or acid forming metallic halides, or any of the various active clays upon unsaturated hydrocarbon bodies. The polymers formed in the so-called "Gray towers," now in common use in the purification of cracked motor fuels, are an example of suitable raw materials. See, also, United States Patent No. 1,836,629 of Thomas and Hochwalt for an example of resins or polymers obtained by means of $AlCl_3$, as well as other patents by the same inventors. The preparation of these polymers is not a part of the present invention and, insofar as I am aware, any polymeric hydrocarbon body which is a viscous liquid, a semi-solid, or a solid at ordinary temperatures may be used.

The desired quantity of the polymer is transferred to a vessel suitable for distillation purposes which is attached to a condenser and receiving vessel. A small amount of water is then added and heat is applied to the distilling vessel containing the polymer and water. As soon as water begins to come over into the receiving vessel an acid reacting compound of phosphorus is added to the distilling vessel containing the hydrocarbon material. For this purpose I prefer orthophosphoric acid, although I may use the pyro- or metaphosphoric acid, thiophosphoric acid, acid salts and acid esters of phosphoric acid, as well as the corresponding acids, salts and esters of phosphorous acid. Heat is applied to the distilling vessel continuously until the reaction is completed; the temperature in the vessel may be varied within wide limits, but usually a temperature will be found between the range 100° C. to 300° C. which will give the optimum results with the material being used. Under the conditions of operation the oil which is formed will be carried over into the receiving vessel along with the steam which condenses. The oil will form a layer on top of the water from which it may be separated by decantation or other suitable means. Often the oil obtained in this manner will be ready for use without further treatment, but occasionally it may be necessary to wash it with an aqueous alkaline solution to remove traces of acidic materials which are carried over along with the oil.

The amount of acid of phosphorus which is added to the polymeric hydrocarbon material may vary within wide limits; that is to say, quantities of phosphoric acid ranging from one percent of the weight of the hydrocarbon material up to several thousand per cent of the weight of this material being treated. Furthermore, the strength of the acid of phosphorus which is used may be varied within wide limits as will be obvious to one skilled in the art. The amount of phosphoric acid which is used in the process is relatively unimportant because it can be recovered by leaching or other known means. Following the recovery it may be desirable to either dilute or concentrate the recovered acid to the desired strength. Furthermore, the strength of the phosphoric acid may be varied within wide limits, as will be obvious to one skilled in the art, because of the fact that when the desired amount of the acid has been added, water is allowed to run in at about the same rate as it gathers in the receiving vessel. In this connection, it may be noted that water is not essential to the operation of my process. It is also to be noted that the use of reduced pressures during the converting and distilling operation are contemplated within the purview of this invention.

While my invention is not to be limited by any explanation, it seems probable that these desirable results are achieved due to a depolymerizing and re-arranging effect which is exerted upon the polymeric hydrocarbon material by the acid of phosphorus under my preferred conditions.

The following specific examples will serve to illustrate the invention but the invention is not restricted to these examples:

*Example I*

Two hundred grams of a viscous hydrocarbon polymer which had been obtained by the treatment of unsaturated hydrocarbons with clay were treated exactly as described above with 200 grams of 85% phosphoric acid. From this, 82 grams of an oil were obtained which, after a mild alkaline wash, was found to have an iodine value of 156 and possessed good drying properties.

*Example II*

Two hundred and fifty grams of a solid resincus hydrocarbon polymer which had been obtained by the treatment of highly unsaturated hydrocarbons with a metallic halide were treated exactly as described above with an equal weight of phosphoric acid. By this procedure 163 grams of an oil were obtained which was highly unsaturated and possessed very desirable drying properties.

Since many apparent and widely divergent embodiments of my invention may be made without departing from the scope thereof, it is to be distinctly understood that my invention is not to be limited except as defined in the appended claims.

What I claim is:

1. The method of making a drying oil suitable for use alone or in admixture with vegetable drying oils, comprising heating at a temperature between approximately 100° and 300° C. and in the presence of an acid of phosphorus a hydrocarbon polymer obtained by polymerization of an unsaturated hydrocarbon, and separating therefrom a liquid distillate having an iodine number of at least 100.

2. The method as defined in claim 1 and further characterized in that the acid is phosphoric acid.

3. The method of making a drying oil suitable for use alone or in admixture with vegetable drying oils, comprising heating at a temperature between approximately 100° and 300° C. and in the presence of an acid of phosphorus a Gray Tower polymer obtained in the treatment with clay of a cracked motor fuel to remove gum constituents and separating therefrom a liquid distillate having an iodine number of at least 100.

4. The method of making a drying oil suitable for use alone or in admixture with vegetable drying oils, comprising heating at a temperature between approximately 100° and 300° C. and in the presence of an acid of phosphorus a resin obtained by the polymerization of an unsaturated liquid hydrocarbon in the presence of an acid reacting polymerization catalyst and separating therefrom a liquid distillate having an iodine number of at least 100.

5. The method of making a drying oil from a hydrocarbon polymer obtained by polymerization of an unsaturated hydrocarbon comprising the steps of heating said hydrocarbon polymer at a temperature between approximately 100° and 300° C. in the presence of an acid of phosphorus and water or steam to effect a depolymerization of said hydrocarbon polymer, distilling the mixture and separating therefrom a highly unsaturated normally liquid hydrocarbon drying oil having an iodine value in excess of 100.

6. The method of making a drying oil suitable for use alone or in admixture with vegetable drying oils, comprising heating at a temperature between 100° and 300° C. and in the presence of phosphoric acid a resin obtained by the polymerization of an unsaturated liquid hydrocarbon in the presence of a metallic halide, and separating therefrom a liquid distillate having an iodine number of at least 100.

7. The method of making a drying oil suitable for use alone or in admixture with vegetable drying oils, comprising heating at a temperature between 100° and 300° C. and in the presence of phosphoric acid a resin obtained by the treatment of a cracked petroleum distillate in the presence of anhydrous aluminum chloride, and separating therefrom a liquid distillate having an iodine number of at least 100.

CHARLES A. THOMAS.